(12) United States Patent
Asakawa et al.

(10) Patent No.: US 7,488,009 B2
(45) Date of Patent: Feb. 10, 2009

(54) PIPE JOINT

(75) Inventors: Mamoru Asakawa, Shinagawa-ku (JP); Junichirou Tanaka, Kusatsu (JP); Isao Fujinami, Kusatsu (JP); Haruo Nakata, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 328 days.

(21) Appl. No.: 10/564,153

(22) PCT Filed: Jul. 12, 2004

(86) PCT No.: PCT/JP2004/009919

§ 371 (c)(1),
(2), (4) Date: Jun. 21, 2006

(87) PCT Pub. No.: WO2005/008119

PCT Pub. Date: Jan. 27, 2005

(65) Prior Publication Data
US 2007/0170723 A1 Jul. 26, 2007

(30) Foreign Application Priority Data
Jul. 18, 2003 (JP) ............................. 2003-276937

(51) Int. Cl.
*F16L 35/00* (2006.01)
(52) U.S. Cl. .................. 285/332.1; 285/249; 285/323
(58) Field of Classification Search .............. 285/246, 285/249, 332.1, 332.4, 386, 322, 323, 248
See application file for complete search history.

(56) References Cited

U.S. PATENT DOCUMENTS

| | | | | |
|---|---|---|---|---|
| 1,862,833 A | * | 6/1932 | Stover | 285/249 |
| 2,579,529 A | * | 12/1951 | Woodling | 285/341 |
| 3,030,130 A | * | 4/1962 | Appleton | 285/248 |
| 3,498,647 A | * | 3/1970 | Schroder | 285/343 |
| 3,676,573 A | * | 7/1972 | Avery | 285/341 |
| 3,746,376 A | * | 7/1973 | Gold | 285/334.2 |
| 3,866,958 A | * | 2/1975 | Gold | 285/334.2 |
| 3,893,716 A | * | 7/1975 | Moreiras et al. | 285/3 |
| 4,043,576 A | * | 8/1977 | Reich et al. | 285/322 |
| 4,586,731 A | * | 5/1986 | Castrup | 285/4 |
| 6,905,142 B2 | * | 6/2005 | Do et al. | 285/89 |
| 7,270,349 B2 | * | 9/2007 | Bamberger et al. | 285/322 |

FOREIGN PATENT DOCUMENTS

| | | |
|---|---|---|
| JP | S58-175287 U | 11/1983 |
| JP | 61-26705 | 8/1986 |
| JP | 2000-304180 | 11/2000 |
| JP | 2001-159481 | 6/2001 |

* cited by examiner

Primary Examiner—David E Bochna
(74) Attorney, Agent, or Firm—Global IP Counselors, LLP

(57) ABSTRACT

A joint includes a joint main body, a sleeve and a nut. The joint main body has a joining hole and an external threaded part. The nut is threaded onto the external threaded part in a threaded state in which the pipe and the sleeve are inserted through the joining hole. The nut joins the pipe to the joining hole via the sleeve. The sleeve is tightly fitted to the pipe and the joining hole by the threading of the nut to induce deformation that expands radially outward. The deformation prevents insertion of the sleeve into the joining hole to a specific position in an unthreaded state in which the pipe and the sleeve have been pulled out from the joining hole.

14 Claims, 5 Drawing Sheets

Prior Art

PIPE JOINT

CROSS REFERENCE TO RELATED APPLICATIONS

This U.S. National stage application claims priority under 35 U.S.C. §119(a) to Japanese Patent Application No. 2003-276937, filed in Japan on Jul. 18, 2003, the entire contents of which are hereby incorporated herein by reference.

TECHNICAL FIELD

The present invention relates to a pipe joint, and particularly to a pipe joint wherein a pipe and a sleeve are inserted into a junction hole in a pipe main body, and a nut is screwed onto a thread on the joint main body.

BACKGROUND ART

Joints (pipe joints) used with fluid pipes that pass fluids through the interior are often capable of being detached to allow for easy replacement and repairs when the pipe deteriorates or when the fluid supply source deteriorates. Pipe joints have various threaded structures according to their application.

In air conditioners or the like, a refrigerant flows through a fluid pipe, and flare joints are often used as pipe joints. Recently, in view of their effects on global warming, studies or practical steps have been made to replace chlorofluorocarbon (CFC) refrigerants with carbon dioxide or alternative CFCs having a high design pressure, or with flammable hydrocarbon-based materials.

For example, when a hydrocarbon is used as the refrigerant, the pressure at which the hydrocarbon is used is about 3 MPa and the joint should withstand the same pressure as a conventionally used CFC refrigerant, but since the hydrocarbon is flammable, the requirement to prevent the refrigerant from leaking through the joint must be even more stringent than before.

Also, when carbon dioxide or an alternative CFC having a higher design pressure than that of a conventional CFC is used as the refrigerant, a pipe joint requires a higher pressure resistance than before.

Therefore, a flareless joint suitable for use at higher pressures than a flared joint must be used.

FIG. 6 shows an example of a conventional general-purpose flareless joint. FIG. 6A shows the joint before a nut 102 has been tightened, and FIG. 6B shows the joint after the nut 102 has been tightened. As shown in FIG. 6, the joint is configured from a joint main body 101, a nut 102, and a sleeve 103 provided between the two, and the structure is designed so that the distal end of the sleeve 103 is wedged onto a pipe 111 to connect the pipe 111 to the joint main body 101. Such a flareless joint has conventionally been used in thick steel pipes, but recently has come to be used to connect thin stainless steel pipes as well.

Japanese Examined Utility Model Application No. 61-26705 discloses a flareless joint used to connect thin stainless steel pipes for indoor piping. A structure is disclosed therein in which a sleeve made of a steel pipe is bent by tightening to prevent the pipe from collapsing when the distal end of the sleeve is wedged onto the pipe.

Japanese Patent Application Laid-Open No. 2001-159481 depicts a flareless joint used to connect thin gas pipes used in coolant piping for machine tools. When an O-ring and one end of a collet are inserted in the stepped portion of the joint main body, a space is formed between the end face of the joint main body and the end face of a projection provided on the outside-diameter portion of the collet. When the collet is tightened with a nut to bring the two end faces in contact with each other, a specific sealing pressure is achieved by the O-ring, and when the nut is tightened further to a specific position, a pawl provided to the inside-diameter portion of the collet is wedged onto the pipe to achieve a specific connecting force.

SUMMARY OF THE INVENTION

Flareless joints are already being used in semiconductor manufacturing apparatuses and stainless steel piping (piping for oil hydraulics and the like) for fluids at high pressures of about 20 MPa, for example.

However, although high sealing properties can be ensured by the plastic deformation and work hardening of the metallic surfaces when the flareless joint is initially fastened, when the joint is reused after having been removed, the sealing strength may be less than during the initial fastening, and the joint may leak as a result of loosening over time due to expansion/contraction or vibration caused by temperature changes.

Accordingly, reusing the flareless joint should be avoided, but when the pipe is pulled out in a conventional flareless joint, the nut is removed and the pipe and the sleeve wedged onto the pipe are pulled out together. When an action that is the opposite of removal is performed, the condition in which the pipe is connected by the joint is restored. The flareless joint can thus be reused after it has been removed, and therefore it may not be possible to ensure airtightness and pressure resistance in the joint portion when the joint is reused.

It is an object of the present invention to resolve the problems resulting from removing the nut from the joint main body and pulling the pipe and sleeve out from the joint main body and then using these items to rejoin the pipe; or, in other words, to resolve the problems of not being able to ensure airtightness or pressure resistance.

A pipe joint according to a first aspect comprises a joint main body, a sleeve, and a nut. The joint main body has an internally formed joining hole for joining the pipe, and a threaded part formed in the outer surface. The nut is screwed onto the threaded part when the pipe and sleeve are inserted through the joining hole, and the pipe is joined to the joining hole via the sleeve. The sleeve is tightly fitted over the pipe and the joint main body by the screwing of the nut over the threaded part, deformation that expands radially outward is induced, and after the nut is removed from the threaded part and the pipe and sleeve are pulled out from the joining hole, insertion into the joining hole to a specific position is no longer possible.

In this arrangement, the pipe and sleeve are inserted through the joining hole in the joint main body, and the nut is screwed onto the threaded part on the joint main body, whereby the sleeve is tightly fitted to the pipe and the joining part of the joining hole, and the pipe is joined to the joint main body. For example, fixing or joining another pipe to the joint main body in advance allows the other pipe and the pipe tightly fitted in the joining part of the joining hole and joined to the joint main body to be connected in a state that ensures airtightness and pressure resistance.

The sleeve is configured so as to cause deformation that expands radially outward to occur when the nut is screwed onto the threaded part of the joint main body. The expanding deformation of the sleeve prevents the sleeve from being inserted through the joining hole to a specific position after the nut is removed from the threaded part and the pipe and sleeve are pulled out from the joining hole. In other words, specific deformation is caused in the sleeve by utilizing the fastening of the nut on the threaded part when the pipe is first joined to the joining part of the joint main body, the deformed sleeve can no longer be inserted to a specific position through the joining hole in the joint main body even when the sleeve is used during rejoining, and it is extremely difficult to reuse a sleeve that has already been used once. Therefore, once the pipe and sleeve are pulled out from the joint main body, the sleeve and the pipe substantially integrated with the sleeve cannot be inserted again through the joint main body to a specific position. Accordingly, the operator who is joining the pipes will not reuse a sleeve or pipe that has already been used and deformed, but will decide to join the pipes with a new sleeve or pipe. It is thereby possible to eliminate the problems resulting from rejoining the pipe by using the pipe and sleeve after the nut has been removed from the joint main body to pull the pipe and sleeve out from the joint main body, or, specifically, the problem of not being able to ensure airtightness or pressure resistance.

In the pipe joint according to a second aspect, in addition to the pipe joint according to the first aspect, a split-level part is formed in the radially external portion of the sleeve. Also, the split-level part is caught on the joint main body, and the sleeve can no longer be inserted through the joining hole to a specific position after the pipe and sleeve have been pulled out from the joining hole.

The split-level part is herein formed in the radially external portion of the sleeve. Therefore, when an attempt is made to force an already used and deformed sleeve through the joining hole of the joint main body, the split-level part catches on the joint main body, and the sleeve cannot be inserted to a specific position through the joining hole of the joint main body with a small amount of force. Also, the catching of the split-level part on the joint main body reminds the operator that a new sleeve must be used and prevents the operator from making any futile attempts to insert the sleeve through the joint main body.

In the pipe joint according to a third aspect, in addition to the pipe joint according to the second aspect, the joint main body is provided with the split-level part. The split-level part of the joint main body catches on the split-level part of the sleeve when the pipe and sleeve that have been pulled out are inserted again. Accordingly, the sleeve that has already been pulled out cannot be inserted to a specific position through the joining hole of the joint main body.

In the pipe joint according to a fourth aspect, in addition to the pipe joint according to the third aspect, a first inclined surface and a second inclined surface that are inclined to the direction of insertion into the joining hole are formed in the sleeve. The first inclined surface widens radially outward with increased distance from the distal end of the sleeve in the direction of insertion. The second inclined surface is formed farther toward the rear end of the sleeve in the direction of insertion than the first inclined surface, and is disposed farther radially inward with increased distance from the first inclined surface.

The first inclined surface and the second inclined surface herein form a V shape in cross section when the sleeve is cut through a surface running along the direction of insertion. When the sleeve is compressed in the direction of insertion, the vicinity of the apex portion of the V shape, that is, the connecting portion of the first inclined surface and the second inclined surface, is deformed to expand radially outward, and once the pipe and sleeve have been pulled out from the joining hole in the joint main body, the sleeve can no longer be inserted again through the joining hole.

In the pipe joint according to a fifth aspect, in addition to the pipe joint according to the fourth aspect, the split-level part of the sleeve is formed between the first inclined surface and the second inclined surface.

The split-level part of the sleeve is herein formed on the connecting portion of the first inclined surface and the second inclined surface that deforms to expands radially outward. Accordingly, the split-level part of the sleeve is initially located at a position in the radial direction in which the part does not catch on the joint main body, but following deformation, the part moves to a position in the radial direction in which the part does catch on the joint main body. After the pipe and sleeve are thereby pulled out from the joining hole, the split-level part of the sleeve catches on the joint main body and the sleeve can no longer be inserted through the joining hole to a specific position.

In the pipe joint according to a sixth aspect, in addition to the pipe joint according to any one of the third aspect through the fifth aspect, a single slit or a plurality of slits running radially outward from the space in the joining hole are formed in the inlet side of the joining hole in the joint main body.

Since slits are herein formed in the joint main body in the inlet side of the joining hole, pulling out the expanded and deformed sleeve along with the pipe from the joining hole allows the split-level part of the joint main body to be elastically to deformed and expanded with a relatively small amount of force even if the sleeve comes into contact with the split-level part of the joint main body. The operation of pulling out the expanded and deformed sleeve along with the pipe from the joining hole is thereby simplified.

In the pipe joint according to a seventh aspect, in addition to the pipe joint according to any one of the third aspect through the sixth aspect, an inclined surface for simplifying the pulling out of the pipe and sleeve is formed in the split-level part of the joint main body.

Since the inclined surface for applying a force that expands the joint main body radially outward is formed in the split-level part of the joint main body, pulling out the expanded and deformed sleeve along with the pipe from the joining hole allows the joint main body to be elastically deformed and expanded with a relatively small amount of force even if the sleeve comes into contact with the joint main body. The operation of pulling out the expanded and deformed sleeve along with the pipe from the joining hole is thereby simplified.

In the pipe joint according to an eighth aspect, in addition to the pipe joint according to any one of the second aspect through the seventh aspect, a nut is prevented from being in threaded engagement with the threaded part of the joint main body at a position in which the split-level part of the sleeve catches on the joint main body.

The split-level part of the sleeve herein catches on the joint main body, and a nut is prevented from being in threaded engagement with the threaded part of the joint main body, even if an attempt is made in which the sleeve that has already been pulled out is inserted through the joining hole in the joint main body. Therefore, the operator is restrained from forcibly screwing the nut over the threaded part of the joint main body.

In the pipe joint according to a ninth aspect, in addition to the pipe joint according to any one of the first aspect through the eighth aspect, an opposing surface that faces the side surface of the nut when the nut is screwed onto the threaded part is formed in the joint main body. In this pipe joint, an appropriate tightening torque for screwing the nut onto the threaded part is set according to the dimensions of the gap between the side surface of the nut and the opposing surface of the joint main body.

The tightening torque can herein be adjusted according to the dimensions of gap between the side surface of the nut and the opposing surface of the joint main body. For example, the tightening torque can be adjusted using a clearance gauge, or the tightening torque can be appropriately set when the side surface of the nut and the opposing surface of the joint main body come into contact with each other.

In the pipe joint according to a tenth aspect, in addition to the pipe joint according to any one of the first aspect through the ninth aspect, the pipe is a copper pipe or a thin stainless steel pipe.

DETAILED DESCRIPTION OF THE INVENTION

<Overall Constitution>

Figure 1:
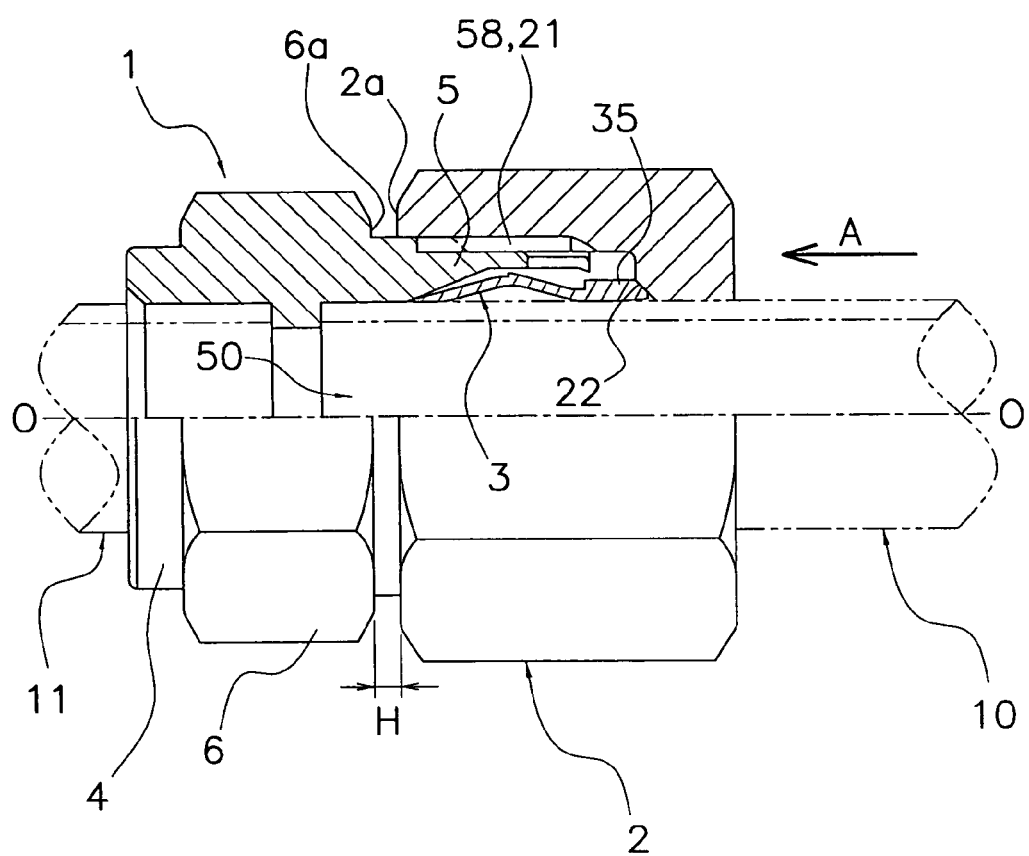
FIG. 1 is a partial cross-sectional side view of a flareless joint according to an embodiment of the present invention.

A pipe joint (flareless joint) according to one embodiment of the present invention has a joint main body 1, a nut 2, and a sleeve 3, as shown in FIG. 1. The joint of this embodiment is used to splice pipes 10 and 11, which are copper pipes or thin stainless steel pipes, and the pipe 10 is detachably joined to a joining hole 50 (described later) in the joint main body 1.

<Constitution of Joint Main Body 1>

Figure 2:
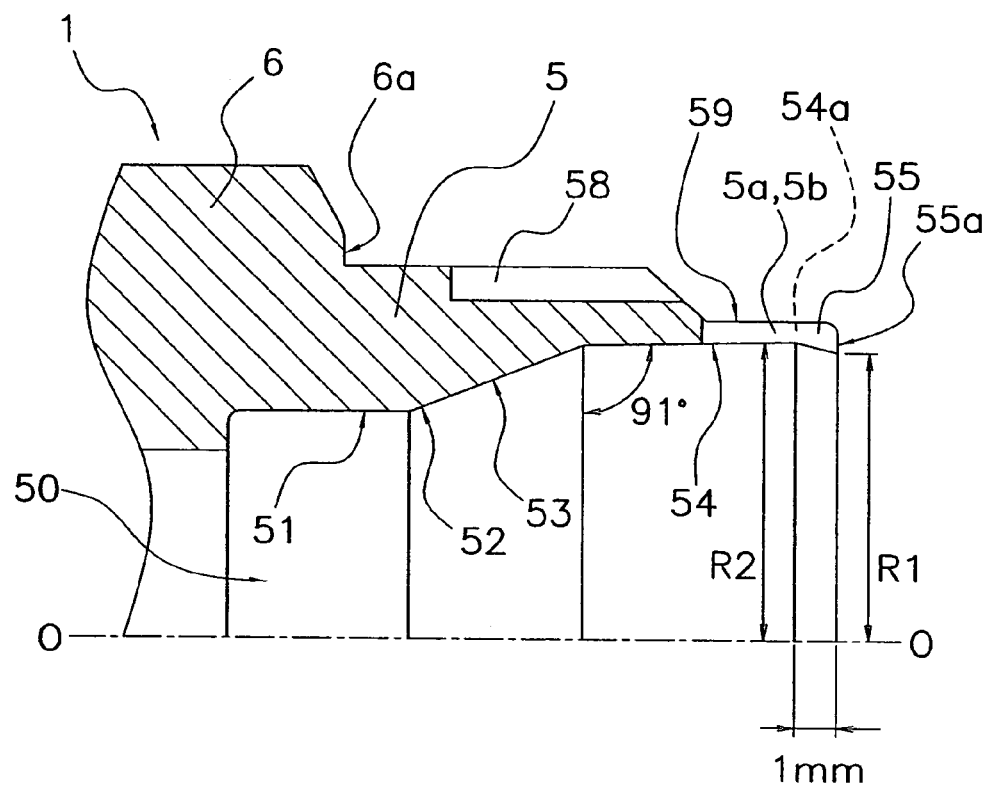
FIG. 2A is a cross-sectional side view of a joint main body.
FIG. 2B is a front view of the joint main body.
Figure 2:
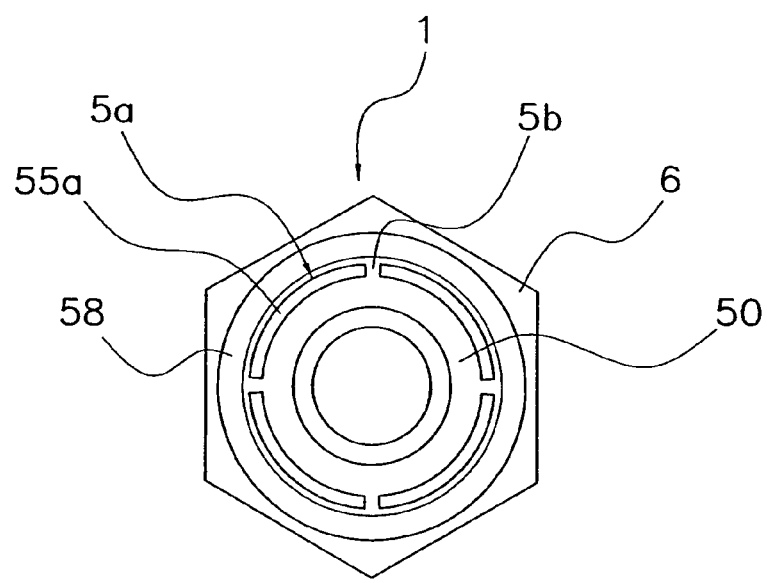

The joint main body 1 is configured from a socket 4 through which the pipe 11 is inserted and brazed, a pipe connector 5 for connecting the pipe 10, and a nut 6 provided to the external periphery, as shown in FIGS. 1 and 2. A side surface 6a of the nut 6 constitutes the opposing surface that faces a side surface 2a of a nut 2, described later.

The pipe connector 5 has a joining hole forming part for forming the joining hole 50 in the interior, as shown in FIG. 2A. This joining hole forming part is configured from an innermost pillar 51, a joining part 52, a first inlet 53, a second inlet 54, and a stepped part 55. The innermost pillar 51 has an inside diameter substantially equal to the outside diameter of the pipe 10. The joining part 52 is a portion for wedging a distal-end fitting part 31 onto the pipe 10 by a tight fit with the distal-end fitting part 31 (see FIG. 3) of the sleeve 3, and the joining part is positioned on the right side of the innermost pillar 51 in FIG. 2A with the inner surface inclined. The first inlet 53 is positioned on the right side of the joining part 52 in FIG. 2A, and the diameter of the inner surface gradually increases away from the joining part 52. The second inlet 54 is positioned on the right side of the first inlet 53 in FIG. 2A and is extended to the right side from the maximum-diameter portion of the first inlet 53. The stepped part 55 is positioned on the right side of the second inlet 54 in FIG. 2A.

The joining part 52 and the first inlet 53 of the joining hole 50 have inner surfaces that are inclined towards the center axis O-O at an angle of 10° to 30° (22.5° in this case).

The second inlet 54 has an inner surface that is inclined towards the center axis O-O at an angle of 0° to 5° (about 1° in this case).

The stepped part 55 is about 1 mm in length and extends so that the inside diameter decreases in the direction from the maximum-diameter end face 54a of the second inlet 54 toward the right side in FIG. 2A, wherein the inside diameter (R1×2) of the end face 55a is about 0.4 mm less than the inside diameter (R2×2) of the end face 54a of the second inlet 54. Specifically, the end face 55a of the stepped part 55 constitutes the entrance of the joining hole 50, and the radius R1 of this entrance is about 0.2 mm less than the inside radius R2 of the end face 54a of the second inlet 54, which is located about 1 mm to the side. The stepped part 55 thereby forms a step of about 0.2 mm near the entrance.

Also, an external threaded part 58 threadably engaged with the nut 2, and a pillar-shaped outer surface 59 located behind the external threaded part 58 (on the right side in FIG. 2A), are formed on the outer surface of the pipe connector 5.

Specifically, the pillar-shaped outer surface 59, and a substantially cylindrical part 5a formed by the internally disposed second inlet 54 and stepped part 55, are disposed on the rear side of the external threaded part 58. This cylindrical part 5a has slits 5b extending along the center axis O-O (see FIG. 2B). There are four slits 5b provided at equal intervals in the circumferential direction.

<Constitution of Nut 2>An internal threaded part 21 threadably engaged with the external threaded part 58 of the joint main body 1, and an inclined surface 22 that serves to press on a pressed part 35 of the sleeve 3 (described later) in the direction of insertion (the direction of the arrow A in FIG. 1), are formed on the internal peripheral surface of the nut 2, as shown in FIG. 2.

<Constitution of Sleeve 3>

Figure 3:
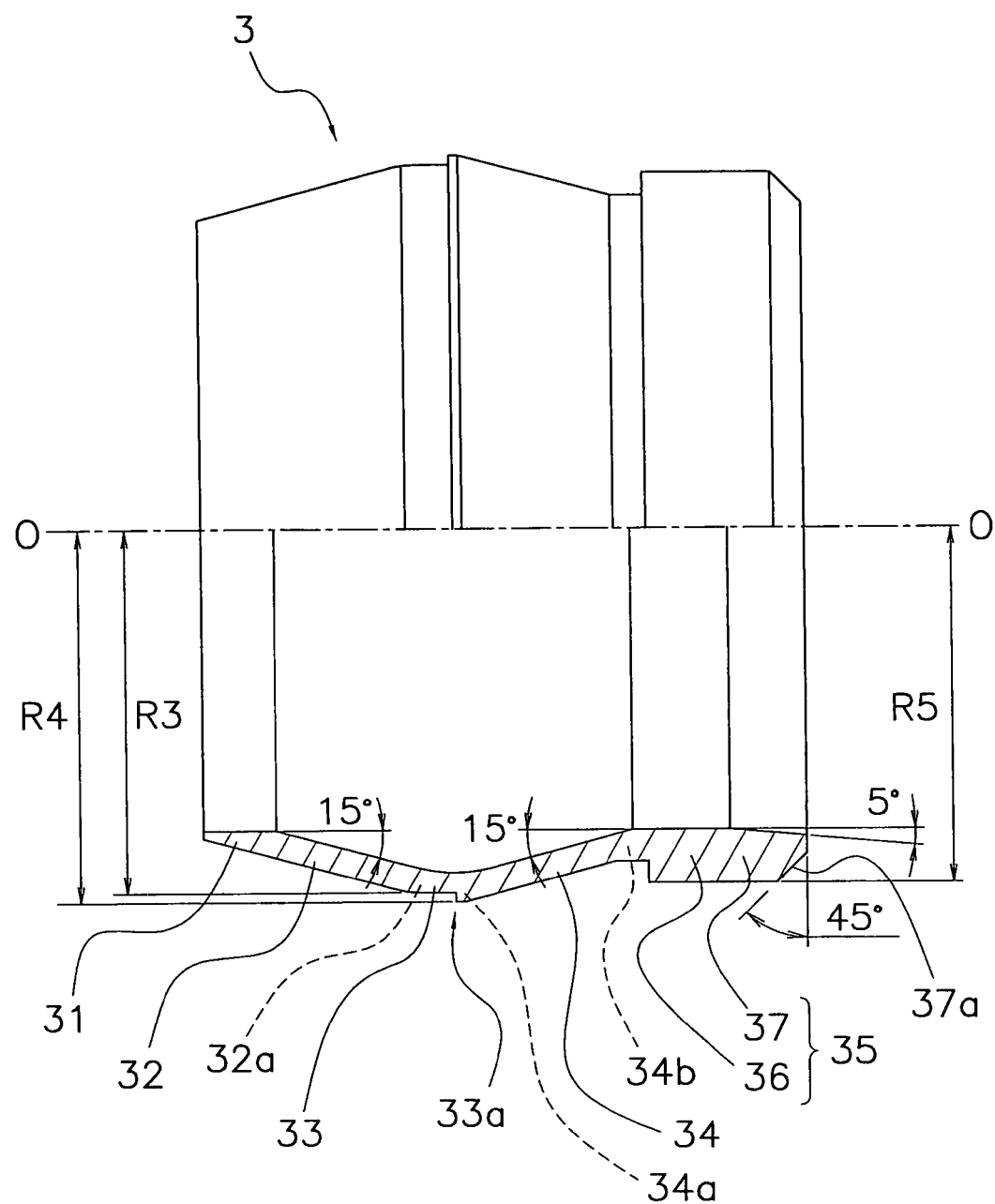
FIG. 3 is a partial cross-sectional side view of a sleeve.

The sleeve 3 is configured from the following, arranged sequentially from the left side in FIG. 3: a distal-end fitting part 31, a first inclined part 32, a linking part 33, a second inclined part 34, and a pressed part 35.

At least the outer surface of the distal-end fitting part 31 is inclined, and the angle of inclination is set to be about 5° to 10° less than the angle of inclination (10° to 30°) of the joining part 52 and first inlet 53 of the joint main body 1. The angle of inclination of the outer surface of the distal-end fitting part 31 is set to 15°, as opposed to the 22.5° angle of inclination of the joining part 52 and first inlet 53. Also, the distal end of the distal-end fitting part 31 constitutes a cutting edge.

Both the outer and inner surfaces of the first inclined part 32 have the same angle of inclination as the outer surface of the distal-end fitting part 31. Although it is possible to vary the angle of inclination of the inner and outer surfaces of the first inclined part 32, it is preferable for these two angles to be the same. Another possibility is for the inner and outer surfaces of the first inclined part 32 to be curved.

The outer and inner surfaces of the second inclined part 34 are inclined to be mostly symmetrical to the first inclined part 32. The angles of inclination thereof are the same as the first inclined part 32.

The linking part 33 connects the maximum-diameter end 32a of the first inclined part 32 to the maximum-diameter end 34a of the second inclined part 34, and the outer surface thereof is not inclined in relation to the center axis O-O. A step is formed between the linking part 33 and the maximum-diameter end 34a of the second inclined part 34. Specifically, the linking part 33 and the second inclined part 34 form the split-level part 33a shown in FIG. 3. The difference in grade of this split-level part 33a is about 0.2 mm. In other words, the difference between the diameter (R3×2) of the outer surface of the linking part 33 and the outside diameter (R4×2) of the maximum-diameter end 34a of the second inclined part 34 is about 0.4 mm.

Also, the outside diameter of the split-level part 33a, or, specifically, the outside diameter (R4×2) of the maximum-diameter end 34a of the second inclined part 34, is formed to be slightly less than the inside diameter (R1×2) of the end face 55a that constitutes the entrance of the stepped part 55 of the joint main body 1 described above.

The pressed part 35 comprises a cylinder-shaped first part 36 that extends from the minimum-diameter end 34b of the second inclined part 34, and a second part 37 that further extends from the first part 36. The pressed part 35 is thicker than the distal-end fitting part 31, the first inclined part 32, the linking part 33, and the second inclined part 34, but the diameter (R5×2) of the external peripheral surface thereof is less than the outside diameter of the split-level part 33a, or, specifically, than the outside diameter (R4×2) of the maximum-diameter end 34a of the second inclined part 34.

The inner surface of the second part 37 of the pressed part 35 is inclined by about 5° in relation to the center axis O-O, and the surface increases in diameter in the direction away from the first part 36. The outer surface of the second part 37 is also inclined so as to draw nearer to the center axis O-O from the middle, and the angle of inclination thereof is about 45°. The inclined surface 37a on the outer surface of the second part 37 receives the action of a force along the center axis O-O from the inclined surface 22 formed on the internal periphery of the nut 2.

Operation Of Joining Pipe 10 To Joint Main Body 1

FIG. 1 shows a flareless joint prior to tightening. As shown herein, in this flareless joint, first the pipe 10 and sleeve 3 are inserted through the joining hole 50 in the joint main body 1 in the direction of insertion (the direction of the arrow A in FIG. 1), the nut 2 is rotated, and the sleeve 3 is pushed forward (to the left in FIG. 1) with the inclined surface 22 in the nut 2. When the nut 2 continues to be rotated, the distal-end fitting part 31 of the sleeve 3 comes into contact with the joining part 52 of the joint main body 1. At this point, the gap H (see FIG. 1) between the side surface 6a of the nut 6 and the side surface 2a of the nut 2 of the joint main body 1 is set to the adequate dimensions or greater. The nut 2 is tightened with a pawl wrench or a monkey wrench until the gap H reaches the specific adequate dimensions, at which point the nut 2 reaches a state of being tightened on the joint main body 1 with an adequate fastening torque. Thus, it is possible herein to confirm the tightening torque according to the gap H between the side surface 6a of the nut 6 and the side surface 2a of the nut 2 of the joint main body 1. The specific adequate dimension mentioned above is set to 0 mm. Specifically, when the nut 2 is tightened on the joint main body 1 until the side surface 6a of the nut 6 of the joint main body 1 reaches the side surface 2a of the nut 2, the nut 2 at this point reaches a state of being tightened on the joint main body 1 with an adequate fastening torque (see FIG. 4).

Figure 4:
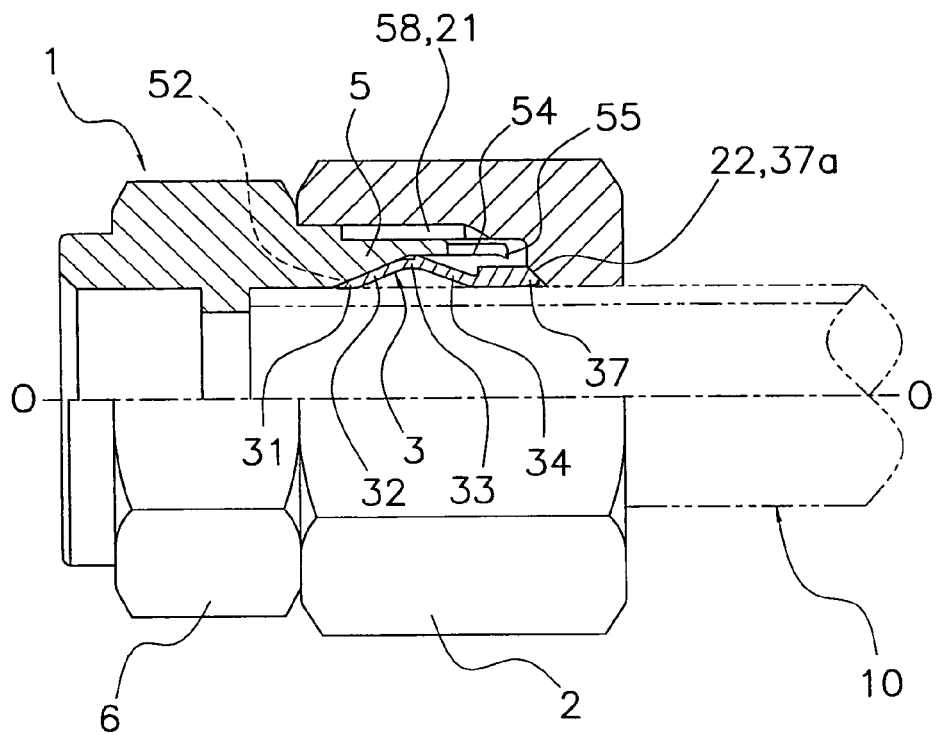
FIG. 4 is a partial cross-sectional side view showing a joined state of the flareless joint.

As described above, when the nut 2 is tightened on the joint main body 1 from the state shown in FIG. 1, the distal-end fitting part 31 of the sleeve 3 is tightly fitted over the pipe 10 and the joining part 52 of the joining hole 50 as shown in FIG. 4, and the first inclined part 32, the linking part 33, and the second inclined part 34 constituting the V shape in cross section are compressed longitudinally (in the direction along the center axis O-O), creating deformation that expands radially outward.

When the sleeve is first fitted over the pipe 10, the cutting edge at the distal end of the distal-end fitting part 31 of the sleeve 3 is wedged onto the surface of the pipe 10. The outer surface of the distal-end fitting part 31 of the sleeve 3 and the joining part 52 of the joining hole 50 are also tightly fitted to prevent fluid leakage by metal contact. Thus, the cutting edge of the distal-end fitting part 31 is wedged onto the surface of the pipe 10, and the outer surface of the distal-end fitting part 31 and the joining part 52 of the joining hole 50 are sealed by metal contact, whereby the pipe 10 is joined to the joint main body 1 in a leakage-free state. Also, as a result of wedging the cutting edge of the sleeve 3 onto the surface of the pipe 10, the pipe 10 will not come loose from the joint main body 1 as long as the nut 2 is not loosened. Since an adequate fastening torque is achieved by setting the gap H between the side surface 6a of the nut 6 and the side surface 2a of the nut 2 of the joint main body 1 to an appropriate dimension (0 in this case), an adequate fastening torque is always ensured even with different operators.

Once the nut 2 is tightened with an adequate tightening torque over the external threaded part 58 of the joint main body 1, the sleeve 3 is compressed longitudinally (to the left and right in FIG. 4), creating plastic deformation that expands radially outward. Therefore, the areas of the linking part 33 of the sleeve 3, as well as the nearby first inclined part 32 and second inclined part 34, are located farther radially outward than initially. Specifically, the outside diameter of the split-level part 33a of the sleeve 3 provided with the linking part 33 and the second inclined part 34, or, in other words, the outside diameter of the maximum-diameter end 34a of the second inclined part 34, is greater than the inside diameter (R1×2) of the end face 55a at the entrance of the stepped part 55 of the joint main body 1. However, if the nut 2 is removed and a force is applied to pull the assembly having the pipe 10 and the sleeve 3 wedged therein out from the joining hole 50 of the joint main body 1, the second inlet 54 of the joining hole 50 may form an inclined surface in which the diameter gradually expands outward (the right side in FIG. 4), and the assembly having the pipe 10 and sleeve 3 can easily be pulled out from the joining hole 50.

When the assembly having the pipe 10 and sleeve 3 is pulled out from the joining hole 50, the split-level part 33a of the sleeve 3 that has deformed and increased in outside diameter is pressed against the inner surface of the stepped part 55 of the joint main body 1, but since a plurality of slits 5b are formed in the cylindrical part 5a of the joint main body 1 having the internally disposed stepped part 55, and the outer surface of the second inclined part 34 adjacent to the split-level part 33a of the sleeve 3 and the inner surface of the stepped part 55 of the joint main body 1 are both inclined, it is possible to elastically deform the cylindrical part 5a of the joint main body 1 outward and to pull the assembly having the pipe 10 and sleeve 3 out from the joining hole 50 with an appropriate amount of force.

Figure 5:
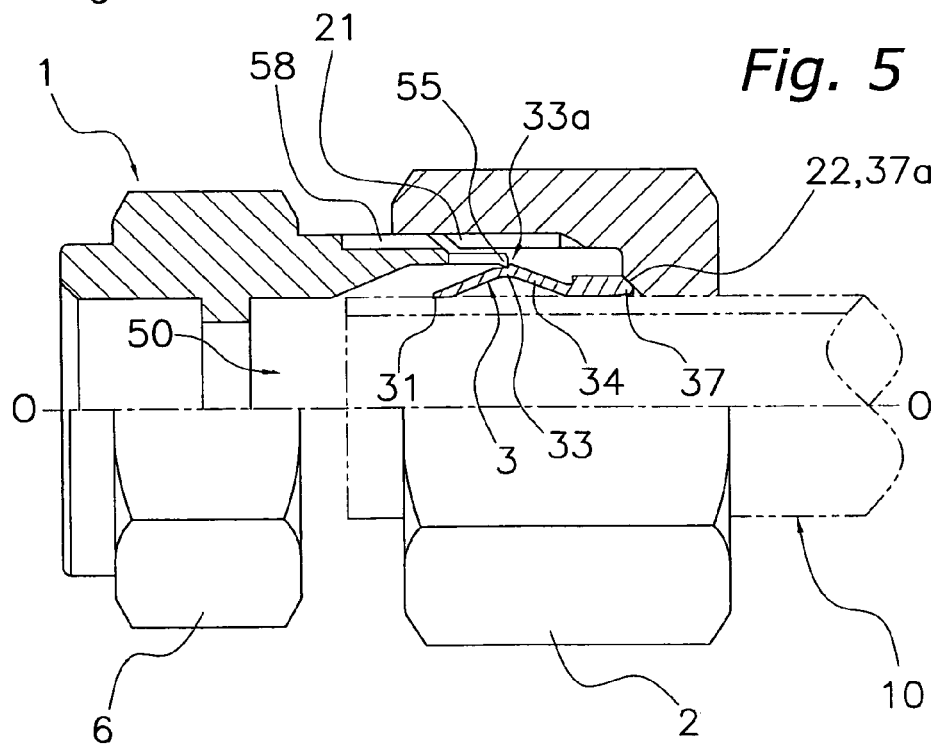
FIG. 5 is a partial cross-sectional side view showing an arrangement in which the flareless joint cannot be reinserted.
Figure 6:
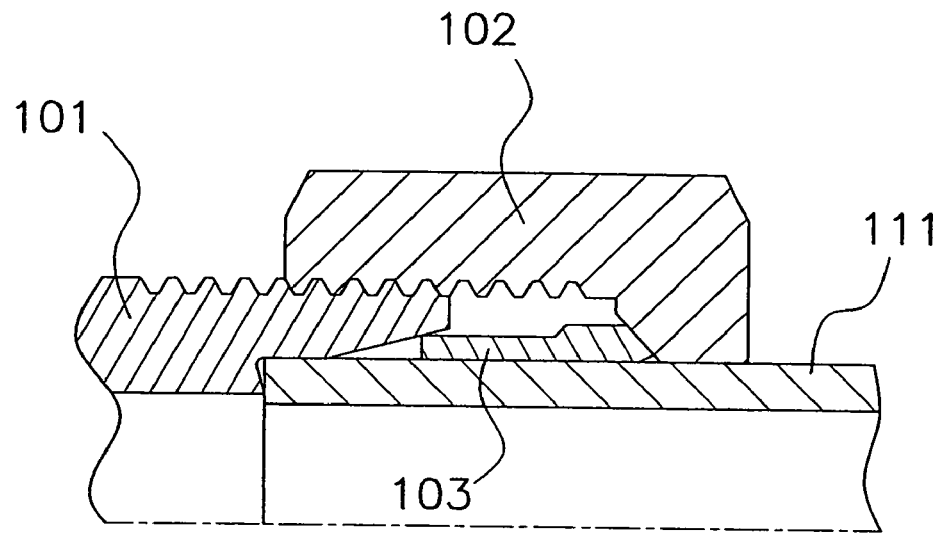
FIG. 6A is a cross-sectional side view showing a conventional general-purpose flareless joint before the nut is tightened.
FIG. 6B is a cross-sectional side view showing the conventional general-purpose flareless joint after the nut is tightened.
Figure 6:
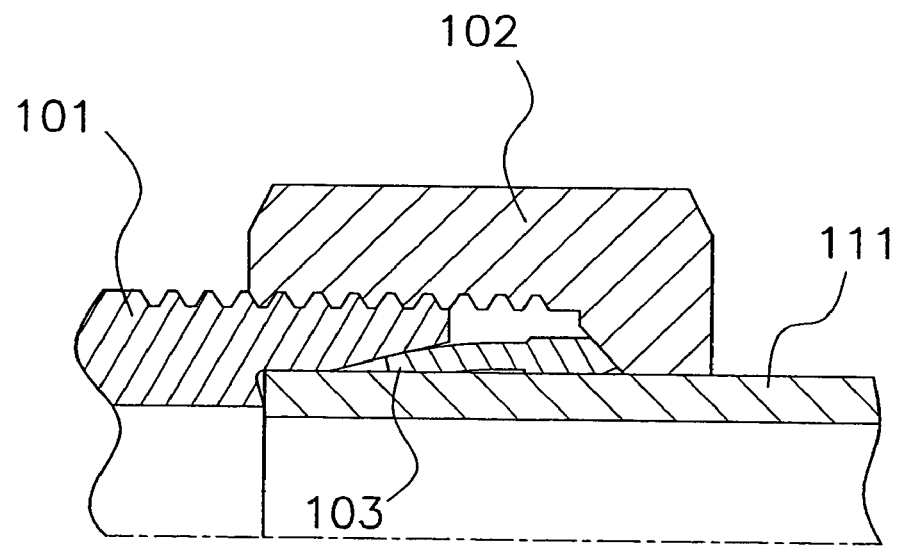

Once the assembly having the pipe 10 and sleeve 3 is pulled out from the joining hole 50 of the joint main body 1, the split-level part 33a of the sleeve 3 that has deformed and increased in outside diameter catches on the stepped part 55 of the joint main body 1, and the assembly having the pipe 10 and sleeve 3 cannot be inserted any further through the joining hole 50, as shown in FIG. 5. The mutually opposing surfaces of the split-level part 33a of the sleeve 3 and the stepped part 55 of the joint main body 1 are both perpendicular to the center axis O-O. Also, when the split-level part 33a of the sleeve 3 is positioned farther to the outside than the end face 55a of the stepped part 55 at the entrance of the joining hole 50, the internal threaded part 21 of the nut 2 is not threadably engaged with the external threaded part 58 of the joint main body 1. In this state, therefore, the internal threaded part 21 of the nut 2 is not in threadable engagement with the external threaded part 58 of the joint main body 1, and the sleeve 3 cannot be forced in the direction of insertion by the nut 2.

CHARACTERISTICS OF FLARELESS JOINT OF PRESENT EMBODIMENT (1)

In this joint, the sleeve 3 is configured as a V shape in cross section so as to cause deformation that expands radially outward when the nut 2 is screwed onto the external threaded part 58 of the joint main body 1. The expanding deformation of the sleeve 3 prevents the sleeve 3 from being inserted through the joining hole 50 to a specific position after the nut 2 is removed from the joint main body 1 and the pipe 10 and sleeve 3 are pulled out from the joining hole 50. Specifically, radially expanding deformation is caused in the sleeve 3 by utilizing the action of tightening the nut 2 onto the external threaded part 58 of the joint main body 1 when the sleeve 3 is initially joined to the joining part 52 of the joint main body 1. The deformed sleeve 3 cannot be inserted any longer through the joining hole 50 of the joint main body 1 to a specific position even when an attempt is made to re-join the sleeve, and it is virtually impossible to reuse a sleeve 3 that has already been used once. Specifically, the split-level part 33a of the deformed sleeve 3 is designed to catch on the end face 55a of the stepped part 55 of the joint main body 1, and the sleeve 3 cannot be inserted any further through the joining hole 50 of the joint main body 1 (see FIG. 5). Also, the internal threaded part 21 of the nut 2 is designed to be prevented from coming into threadable engagement with the external threaded part 58 of the joint main body 1 at this time.

Therefore, the operator will not be able to able to attempt to force the nut 2 to be screwed onto the external threaded part 58 of the joint main body 1. Specifically, the operator will be reminded that a new sleeve must be used, and will not make any futile attempts to insert the sleeve 3 through the joining hole 50 of the joint main body 1. Therefore, an operator attempting to join the pipe 10 to the joint main body 1 will not reuse an already used and deformed sleeve 3 or pipe 10, and will decide to join the pipe 10 using new components. This makes it possible to eliminate the problems resulting from rejoining the pipe 10 by using the pipe 10 or sleeve 3 after the nut 2 has been removed from the joint main body 1 to pull the pipe and sleeve out from the joint main body 1, that is, the problem of not being able to ensure airtightness or pressure resistance.

In the flareless joint that is a pipe joint according to the present embodiment, the assembly having the pipe 10 and sleeve 3 cannot be reused, and a new pipe and sleeve must be prepared, but it is still possible to reuse the joint main body 1 and the nut 2. In practice, in a combination of the pipe 10 and sleeve 3 that cannot be reused any longer, the distal end portion can be cut away from the pipe 10 in which the sleeve 3 has been wedged and integrated, whereby the pipe 10 can be rejoined with the joint main body 1 by fitting a new sleeve over the remaining pipe 10.

(2)

In this joint, there is the danger that the stepped part 55 constituting the entrance of the joining hole 50 of the joint main body 1 will expand radially outward due to elastic deformation and that the pipe 10 and sleeve 3 will be inserted farther into the joining hole 50 if the pipe 10 and sleeve 3 that have already been pulled out are forced into the entrance, assuming that the inside diameter (R1×2) of the end face 55a of the stepped part 55 at the entrance is greater than the inside diameter (R2×2) of the inclined second inlet 54.

However, the inside diameter of the stepped part 55 decreases in the direction from the second inlet 54 toward the right side in FIG. 2A, so that the inside diameter (R1×2) of the end face 55a of the stepped part 55 at the entrance of the joining hole 50 is less than the inside diameter (R2×2) of the second inlet 54. Therefore, it is no longer possible to force the used pipe 10 and sleeve 3 through the entrance of the joining hole 50 (see FIG. 5).

(3)

In this joint, a plurality of slits 5b are provided in the cylindrical part 5a that forms the area near the entrance of the joining hole 50. Therefore, when the expanded and deformed sleeve 3 is pulled out along with the pipe 10 from the joining hole 50, the cylindrical part 5a elastically deforms and expands radially outward with a relatively small amount of force even if the external peripheral portion of the second inclined part 34 of the sleeve 3 comes into contact with the stepped part 55 of the radially internal portion of the cylindrical part 5a. The operation of pulling out the expanded and deformed sleeve 3 along with the pipe 10 from the joining hole 50 is thereby simplified.

Furthermore, when the sleeve 3 is pulled out from the joining hole 50, the inclined outer surface of the second inclined part 34 of the sleeve 3 is caused to come into contact with the inclined inner surface of the stepped part 55 and to apply a force to the cylindrical part 5a that expands the cylindrical part 5a radially outward. This also simplifies the operation of pulling out the expanded and deformed sleeve 3 along with the pipe 10 from the joining hole 50.

(4)

In this joint, the fastening torque can be managed by the dimension of the gap H between the side surface 6a of the nut 6 and the side surface 2a of the nut 2 of the joint main body 1. Specifically, when the nut 2 is tightened on the joint main body 1 until the side surface 6a of the nut 6 of the joint main body 1 reaches the side surface 2a of the nut 2, that is, the nut 2 is tightened on the joint main body 1 until the gap H is zero, the nut 2 at this point reaches a state of being tightened on the joint main body 1 with an adequate tightening torque. It is also possible, of course, to design the structure so that an adequate tightening torque is achieved when the nut 2 is tightened on the joint main body 1 until the gap H reaches 1 mm, for example.

(5)

A flareless joint such as the one described above is particularly advantageous when used as a pipe joint in a refrigeration unit or an air conditioner in which an alternative CFC is used at a high pressure. Specifically, when used as the joint of a pipe that has a service pressure of 1 MPa or greater, or even 2 MPa or greater, the joint has effective airtightness and pressure resistance.

Also, in cases in which the joint is used in the piping of a refrigeration unit or an air conditioner, greater pressure resistance than normal is required because of severe temperature changes and pressure changes in the refrigerant, but these stringent requirements can be met by using the joint according to the present embodiment. Particularly, the joint according to the present embodiment has effective airtightness and pressure resistance in a refrigeration unit or air conditioner in which the temperature changes are at least 10° C. or greater and the pressure changes are 0.3 MPa or greater, or in which the temperature changes are 20° C. or greater and the pressure changes are 0.5 MPa or greater under normal conditions.

MODIFICATIONS (A)

In the embodiment described above, the socket 4 is a portion in which the pipe 11 is inserted and brazed, but the socket 4 may also be a threaded part that is screwed into a device or the like, or the socket may have the same structure as the pipe connector 5.

(B)

The stepped part 55 of the joint main body 1 and the split-level part 33a of the sleeve 3 are not limited to the shapes shown in FIGS. 2 and 3, and it is also not absolutely necessary for these parts to have a difference in grade.

TEST EXAMPLES

The following tests were conducted using a brass flareless joint for a copper pipe with the configuration shown in the embodiment described above.

<Usage Conditions>
   Rated pressure: 5 MPa, withstand pressure: 20 MPa, fluid: alternative CFC (LPG)
   (Test Piece and Tightening Torque)
   Pipe A: outside diameter 6.35 mm×thickness 0.8 mm, torque: 12 N·m
   Pipe B: outside diameter 9.52 mm×thickness 0.8 mm, torque: 20 N·m
   Pipe C: outside diameter 12.7 mm×thickness 0.8 mm, torque: 35 N·m <Test Results>
   In the airtightness test, the pressure was increased by 5.5 MPa with nitrogen gas, the pressure was maintained for 10 minutes under immersion in water, and leakage was confirmed by air bubbles. In this airtightness test, no leakage was noted in any of the test pieces.
   In the pressure resistance test, hydraulic pressures of 10 MPa and 20 MPa were applied and maintained for 10 minutes, but no irregularities were observed in any of the test.
   All of the joint assemblies underwent pipe breakage.

INDUSTRIAL APPLICABILITY

According to the present invention, it is possible to eliminate the problems resulting from rejoining a pipe by using the pipe and sleeve after the nut has been removed from the joint main body to pull the pipe and sleeve out from the joint main body, or, specifically, the problem of not being able to ensure airtightness or pressure resistance.

What is claimed is:

1. A pipe joint, comprising:
   a joint main body having a joining hole with an inside surface configured to receive a pipe and a threaded part formed on an outer surface;
   a nut threaded onto said threaded part in a threaded slate; and
   a sleeve dimensioned to be received in said joining hole to a specific position when the nut is in the threaded state and said pipe is inserted in said joining hole such that said nut retains said pipe in said joining hole via said sleeve tightly engaging said pipe and said joint main body by the threading of said nut onto said threaded part to the threaded state, with the sleeve being deformed to expand radially outward, and to prevent subsequent insertion of said sleeve into said joining hole to the specific position in a subsequent unthreaded state in which said pipe and said sleeve have been pulled out from said joining hole after said nut has been threaded onto said threaded part to reach the threaded state in which the sleeve has been deformed, said sleeve having a radially external portion with a split-level part, with said split-level part being engageable on said joint main body such that insertion of said sleeve into said joining hole to the specific position is prevented after said sleeve has been deformed by said nut being in said threaded state,
   said joint main body having a split part that engages said split-level part of said sleeve when said sleeve is reinserted after said sleeve has been deformed by said nut being in said threaded state.

2. The pipe joint as recited in claim 1, wherein
   said sleeve includes a first inclined surface and a second inclined surface that are respectively declined and inclined toward a direction of insertion into said joining hole,
   said first inclined surface widens radially outward with increased distance from a distal end of said sleeve in the direction of insertion, and
   said second inclined surface is formed farther toward a rear end of said sleeve in the direction of insertion than said first inclined surface, and connects to said first inclined surface at said split-level part such that the outer diameter of said first inclined surface at said split-level part is smaller than the outer diameter of said second inclined surface at said split-level part.

3. The pipe joint as recited in claim 2, wherein
   said split-level part of said sleeve is formed between said first inclined surface and said second inclined surface.

4. The pipe joint as recited in claim 3, wherein
   said joint main body includes at least one slit extending radially outward from a space in said joining hole at an inlet side of said joining hole.

5. The pipe joint as recited in claim 3, wherein
   said split part of said joint main body includes an inclined surface to simplify the pulling out of said pipe and said sleeve.

6. The pipe joint as recited in claim 2, wherein
   said joint main body includes at least one slit extending radially outward from a space in said joining hole at an inlet side of said joining hole.

7. The pipe joint as recited in claim 2, wherein
   said split part of said joint main body includes an inclined surface to simplify the pulling out of said pipe and said sleeve.

8. The pipe joint as recited in claim 2, wherein
   said nut and said sleeve are configured and arranged to prevent threaded engagement of said nut with said threaded part of said joint main body by said split-level part of said sleeve engaging said joint main body after said sleeve has been deformed by said nut being in said threaded state.

9. The pipe joint as recited in claim 1, wherein
   said joint main body includes at least one slit extending radially outward from a space in said joining hole at an inlet side of said joining hole.

10. The pipe joint as recited in claim 1, wherein
    said split part of said joint main body includes an inclined surface to simplify the pulling out of said pipe and said sleeve.

11. The pipe joint as recited in claim 1, wherein said joint main body includes an opposing surface that faces a side surface of said nut when said nut is screwed onto said threaded part, and said side surface of said nut and said opposing surface of said joint main body are dimensioned to form a gap in the threaded state to obtain an appropriate tightening torque to screw said nut onto said threaded part.

12. The pipe joint as recited in claim 1, wherein said pipe is a copper pipe or a thin stainless steel pipe.

13. The pipe joint as recited in claim 1, wherein said nut and said sleeve are configured and arranged to prevent threaded engagement of said nut with said threaded part of said joint main body by said split-level part of said sleeve engaging said joint main body after said sleeve has been deformed by said nut being in said threaded state.

14. A pipe joint, comprising:

a joint main body having a joining hole with an inside surface configured to receive a pipe and a threaded part formed on an outer surface;

a nut threaded onto said threaded part in a threaded state; and a sleeve dimensioned to be received in said joining hole to a specific position when the nut is in the threaded state and said pipe is inserted in said joining hole such that said nut retains said pipe in said joining hole via said sleeve tightly engaging said pipe and said joint main body by the threading of said nut onto said threaded part to the threaded state, with the sleeve being deformed to expand radially outward, and to prevent subsequent insertion of said sleeve into said joining hole to the specific position in a subsequent unthreaded state in which said pipe and said sleeve have been pulled out from said joining hole after said nut has been threaded onto said threaded part to reach the threaded state in which the sleeve has been deformed, said sleeve having a radially external portion with a split-level part, with said split-level part being engageable on said joint main body such that insertion of said sleeve into said joining hole to the specific position is prevented after said sleeve has been deformed by said nut being in said threaded state, said nut and said sleeve being configured and arranged to prevent threaded engagement of said nut with said threaded part of said joint main body by said split-level part of said sleeve engaging said joint main body after said sleeve has been deformed by said nut being in said threaded state.

* * * * *